United States Patent
Williams

(10) Patent No.: US 11,295,291 B2
(45) Date of Patent: Apr. 5, 2022

(54) LOW BATTERY AND DIGITAL WALLET

(71) Applicant: PAYPAL, INC., San Jose, CA (US)

(72) Inventor: Megan Marie Williams, Santa Cruz, CA (US)

(73) Assignee: PAYPAL, INC., San Jose, CA (US)

(*) Notice: Subject to any disclaimer, the term of this patent is extended or adjusted under 35 U.S.C. 154(b) by 769 days.

(21) Appl. No.: 14/582,919

(22) Filed: Dec. 24, 2014

(65) Prior Publication Data

US 2016/0189131 A1 Jun. 30, 2016

(51) Int. Cl.
*G06Q 20/32* (2012.01)
*H04W 52/02* (2009.01)

(52) U.S. Cl.
CPC ....... *G06Q 20/327* (2013.01); *G06Q 20/3224* (2013.01); *H04W 52/0261* (2013.01); *Y02D 30/70* (2020.08)

(58) Field of Classification Search
USPC .......................................................... 705/39
See application file for complete search history.

(56) References Cited

U.S. PATENT DOCUMENTS

| 8,438,079 B1* | 5/2013 | Nguyen | G06Q 30/0635 |
| | | | 705/26.81 |
| 8,459,544 B2* | 6/2013 | Casey | G06Q 20/35785 |
| | | | 235/379 |
| 8,639,291 B1* | 1/2014 | Gailloux | H04W 52/0274 |
| | | | 455/558 |
| 2011/0320345 A1* | 12/2011 | Taveau | G06Q 20/3226 |
| | | | 705/39 |
| 2012/0169608 A1* | 7/2012 | Forutanpour | G09G 3/342 |
| | | | 345/173 |
| 2013/0054417 A1* | 2/2013 | O'Donoghue | G06Q 20/3278 |
| | | | 705/26.43 |

(Continued)

FOREIGN PATENT DOCUMENTS

WO  WO-2014133489 A1 * 9/2014 ............. G06F 11/30

OTHER PUBLICATIONS

PR Newswire, Smart Technology Products with Rechargeable Batteries Elevate Consumer Interest—Amazing One Year Time Span Between Battery Charges for Wocket Smart Wallet, Aug. 12, 2014, PR Newswire Association LLC, Dateline/Coral Springs, Florida, 2 pages (Year: 2014).*

(Continued)

*Primary Examiner* — Benjamin S Brindley
(74) *Attorney, Agent, or Firm* — Haynes and Boone, LLP

(57) ABSTRACT

A system and/or method may be provided to assure a payment being made via a user device before the user device fully runs out of battery power. In particular, while a user device is running out of battery power, the system may allow a user to designate a merchant/user/service to which the user may make payments via a user device without user authentication and/or awareness. Under the same situation of low battery power, the system may also allow the user to make payments to a merchant/user/service with which the user frequently shops without user authentication and/or initial awareness. After the payment being made, the system may communicate with the user with further action, which requires no or low consumption of battery power.

20 Claims, 5 Drawing Sheets

(56) References Cited

U.S. PATENT DOCUMENTS

| | | | | |
|---|---|---|---|---|
| 2013/0204791 A1* | 8/2013 | Dorsey | ............. | G06Q 20/3224 |
| | | | | 705/44 |
| 2013/0320080 A1* | 12/2013 | Olson | .................. | G07F 7/0833 |
| | | | | 235/380 |
| 2014/0040120 A1* | 2/2014 | Cho | ................. | H04W 52/0261 |
| | | | | 705/39 |
| 2014/0040131 A1* | 2/2014 | Andrews | ............... | G06Q 30/00 |
| | | | | 705/44 |
| 2014/0095385 A1* | 4/2014 | Ainslie | ................. | G06Q 20/40 |
| | | | | 705/44 |
| 2014/0108241 A1* | 4/2014 | Tunnell | ............... | G06Q 20/363 |
| | | | | 705/41 |
| 2015/0220914 A1* | 8/2015 | Purves | .................. | G06Q 20/36 |
| | | | | 705/26.8 |
| 2015/0339661 A1* | 11/2015 | Li | ....................... | G06Q 20/351 |
| | | | | 705/41 |

OTHER PUBLICATIONS

PCT International Search Report and Written Opinion of the International Searching Authority, dated Mar. 2, 2016, in PCT Patent Application No. PCT/US2015/063522.

* cited by examiner

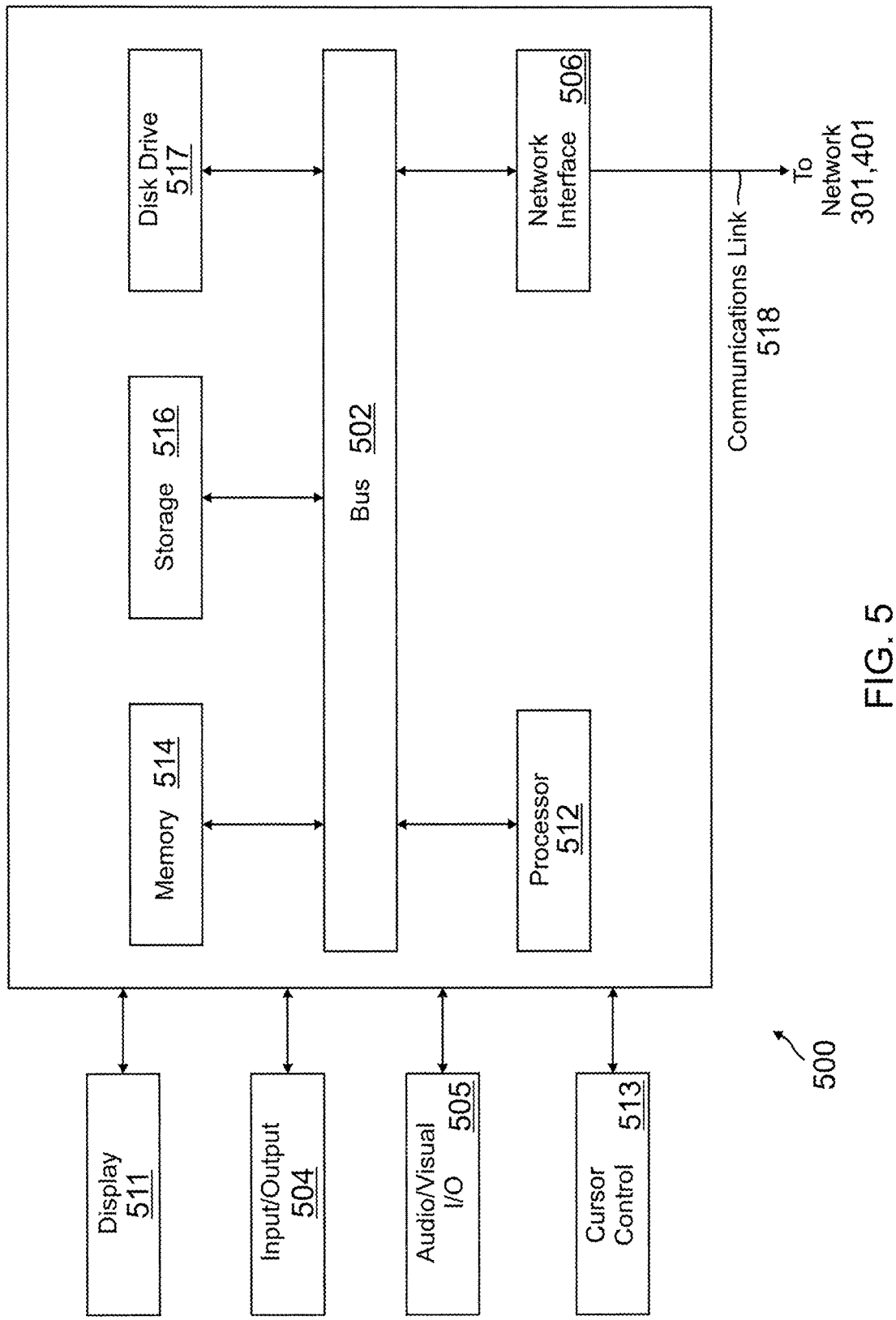

LOW BATTERY AND DIGITAL WALLET

TECHNICAL FIELD

The present application generally relates to a mobile device and more specifically to power management of a mobile device.

BACKGROUND

In today's commerce, many payment transactions, such as retail purchases, payment transactions, and the like, are made electronically using electronic devices, such as mobile phones and/or other mobile computing devices. For example, a consumer may install a payment app on his or her mobile device to facilitate payments to various merchants or recipients. Such electronic devices are typically battery-powered. As such, the battery-powered device may only operate for a certain amount of time because of a limited battery capacity. The device generally becomes unavailable to make any payment transactions after the battery capacity is depleted (i.e., out of battery power). As such, inconvenience may be caused for a user of the electronic device, especially when the user intends to use the electronic device to make a payment transaction. Therefore, there is a need for a system or a method that assures a payment being made via a mobile device before the mobile device runs out of battery power.

BRIEF DESCRIPTION OF THE DRAWINGS

FIG. 5 is a block diagram of a computer system suitable for implementing one or more components in FIGS. 3 and/or 4, according to an embodiment.

Figure 1:
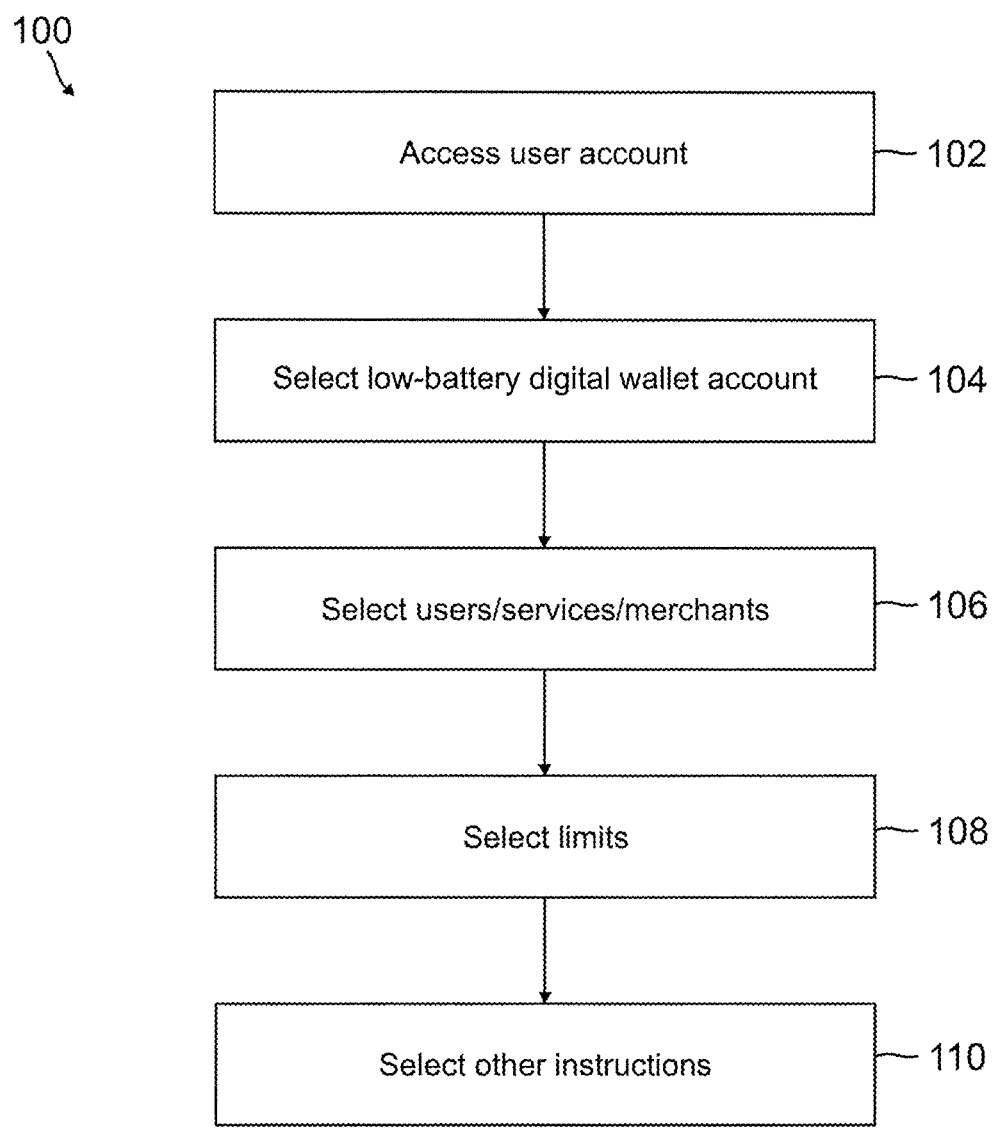
FIG. 1 is a flowchart showing a process a user performs to set up a low battery digital wallet (LBDW) account with a payment provider, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system and/or method may provide an assurance of a payment being made via a user device before the user device fully runs out of battery power. In particular, the system may allow a user to designate a merchant to which the user may make payments via a user device without user authentication and/or awareness while a remaining capacity of the user device's battery has been depleted below a threshold. Further, the system may allow the user to make payments to a merchant with which the user frequently shops without user authentication and/or awareness while a remaining capacity of the user device's battery has been depleted below a threshold. As such, the user may make a payment to the designated merchant without submitting the user's user ID and/or password before the user device's battery is fully depleted. In another embodiment, a notification can be sent to the merchant preauthorizing the user for a certain amount when the user's device is detected as running out of power. In another embodiment, a certain amount can be sent or credited to the merchant on behalf of the user when the user's device is detected as running out of power. In this case, if the user makes a purchase with less than the prepaid amount, the merchant may refund the excess to the user. In yet another embodiment, a payment provider service may determine when the batter power on a user device is running low, and based on various information, such as user shopping habits, user location, current device power usage, and predicting shopping, take or suggest action to the user, such as ending a phone conversation, closing certain apps, pause a data transfer or download, etc. In another embodiment, when the user is detected at a merchant location, such as through beacons (e.g., Bluetooth Low Energy) or a checkin, the merchant may see remaining battery power on the user device. This can be upon entry to the merchant location or any time during a user's visit in the merchant location. When low power is detected, the merchant may preauthorize a certain amount for the user, such that the user can make a payment with the user's account without consuming any power to the user device. Thus, the user may make payments even when the remaining capacity of the battery is low or depleted.

FIG. 1 is a flowchart showing a process 100 a user performs to set up a low-battery digital wallet (LBDW) account with a payment provider, such as PayPal Inc. of San Jose, Calif., according to one embodiment. At step 102, the user accesses a user account with the payment provider. The user may access the account through a user device, such as a smart phone, a computing tablet, or other mobile computing device. For a smart phone, the user may access a mobile app, which makes a request to the payment provider and displays a login screen on the smart phone. For a mobile computing device, the user may enter the URL address of the payment provider and select a link on the payment provider site that opens a login page. Generally, such a user device is battery-powered, and thus may be subjected to limited operation time. To avoid being unable to make a payment through such a battery-powered device, a user may wish to set up the LBDW account when the user is expecting to use the services of the payment provider for payments through a user device. In some embodiments, the user may make a payment to a designated user/service/merchant without entering or providing the user's user ID and/or password, and/or informing the user, before the user device's battery power is fully depleted or depleted to the extent that a payment request cannot be fully processed.

To access the user's account, the user may be asked to enter specific information, such as a user identifier and a login credential. These may include a user name, an email address, a phone number, a password, biometric (e.g., fingerprint scan), or a PIN. The requested information is then communicated to the payment provider, such as through the user device or other means like a phone call or voice. If the user can be authenticated, the user is provided access to the user's account by the payment provider.

Once the user accesses the account, the user may see a home page of the account. On the home page may be an option to create, revise, view, or otherwise access a LBDW account. This may be in the form of a tab, link, button, or other user-selectable means. The user may select this option at step 104 to access the LBDW account option. The user may then be directed to a new screen or a pop-up screen having LBDW account information.

At step 106, the user may specify another user, a service, and/or a merchant as a pre-authorized user/service/merchant for payments. For example, the user may frequently perform financial transaction to the user's colleague so that the user may select the colleague as a pre-authorized user in the user's LBDW account. The user may specify the user/service/merchant in any number of ways. For example, the user may use a mobile device via a user interface to toggle on/off each merchant that is included in a merchant list that the user frequently shops with. More specifically, toggling on a merchant means that the merchant is pre-authorized, and toggling off a merchant means that the merchant is not pre-authorized.

At step 108, the user may select one or more limits for the user/service/merchant. For example, the user may want to limit account availability to $20 USD while shopping in a first merchant. Additionally or alternatively, the user may provide limits according to a day or days. For example, the user may set a limit of $100 USD on February 2, $150 USD on February 3, and $200 USD on February 4 and February 5. In another example, a total limit may be set, either on the number of transactions and/or the total purchase amount. Further, the user may provide limits to one or more user/service/merchant associated with a day or days. For example, the user may set a limit of $10 USD on February 2 for a first merchant, $50 USD on February 3 for a second merchant.

At step 110, the user may set other restrictions as desired for the users, services and/or merchants. Other restrictions may include the number of transactions allowed for each user, each service, or the merchant. Additional restrictions may also include time restrictions as to when a payment request is to be allowed or blocked based on when the payment request is made. For example, if the user does not plan on doing any financial transaction from 2 a.m. to 6 a.m. to any user, service, or merchant, the user may specify that any payment requests made during that time should be denied.

Note that one or more of the steps discussed herein may be combined, performed in a different sequence, omitted, or a combination thereof. For example, the user may simply opt in for the LBDW service without setting any specific limitations or restrictions. In such a case, the service provider may determine, through the user history (e.g., spending history), account information, transaction details, and other information, whether to approve a payment request when the user's device is out of power.

Figure 2:
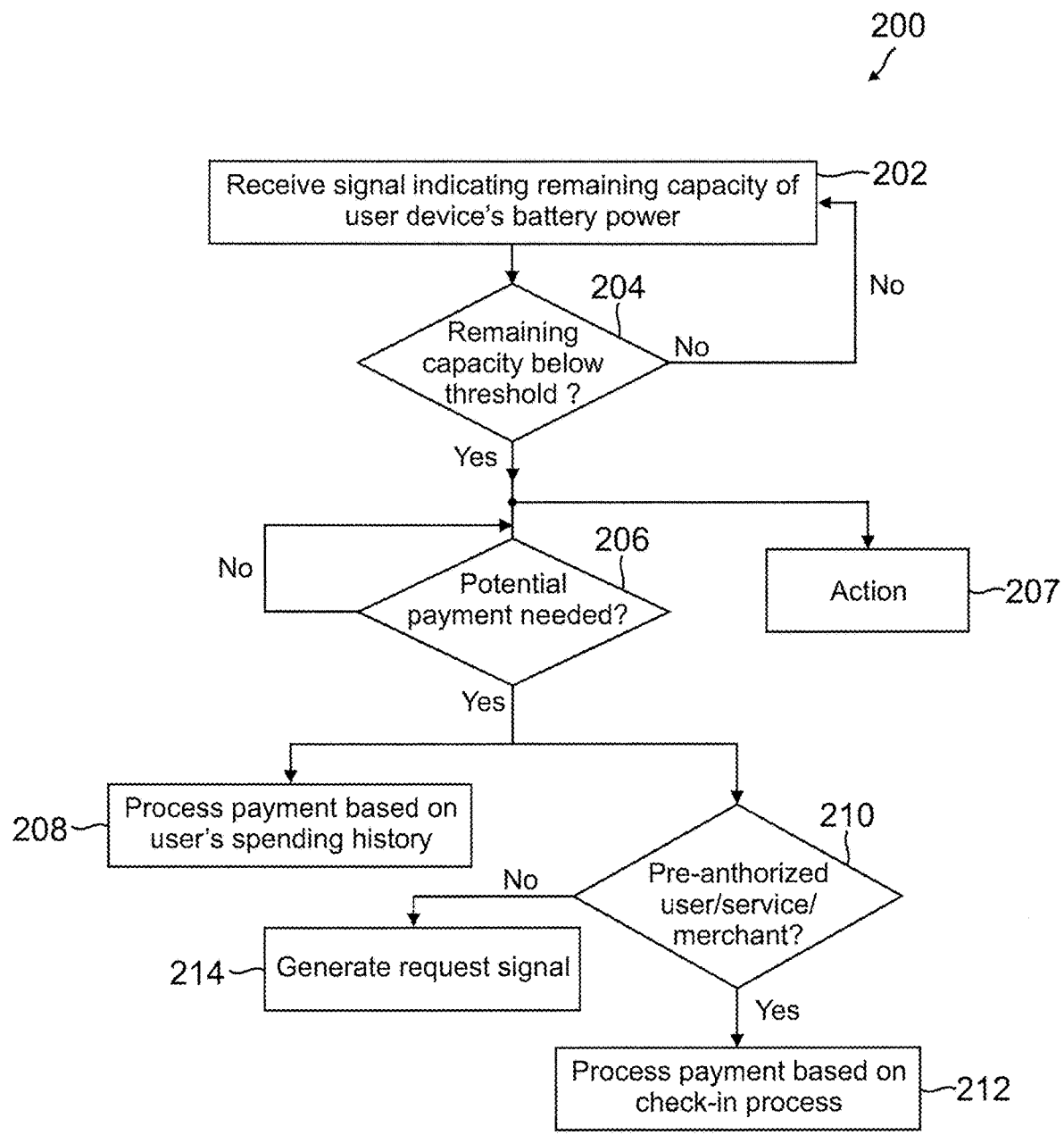
FIG. 2 is a flowchart showing a process showing a payment provider performs in processing a payment while a user device is running out of battery, according to an embodiment.

FIG. 2 is a flowchart showing a process 200 a payment provider performs in processing a payment for a user device while the user device is running out of battery in accordance with one embodiment. The process 200 starts at step 202 with receiving a signal indicating a remaining capacity of the user device's battery. In an embodiment, the remaining capacity of the battery is generally directed to how much percentage the battery remains, and in turn, may be associated with how much time the user device may remain to be operated by the user. Thus, the signal indicating the remaining capacity of the battery may be implemented as a remaining capacity level of the battery, such as a percentage value. Further, according to some illustrative embodiments, the signal indicating the battery's remaining capacity may be transmitted from the user device and received by the payment provider. In some other embodiments, the signal may also be received by the payment provider through a third-party server, such as a merchant device. The signal may further include a user account identifier, such as the user's phone number. Other information may also be included, such as a user name, email address, and password/PIN, associated with the user's LBDW account maintained by the payment provider. Such a signal may be transmitted, over a network, to the payment provider through a mobile app or browser on the user device.

After the payment provider receives the signal indicating the remaining capacity level of the battery, the process continues at step 204 with determining whether the remaining capacity of the battery is below a threshold. In an embodiment, the battery may be predefined by the payment provider and/or the user. For example, the user may specify the threshold at 20%, which means that whenever the remaining capacity of the user device's battery is below 20%, the process may continue at step 206 with using the LBDW account described in the process 100 of FIG. 1. However, if the remaining capacity of the battery is not less than 20%, the process 200 may route to step 202 with keep monitoring the remaining capacity of the user device by receiving the signal described in step 202. The threshold may also be dynamic, as described below.

In other embodiments, the signal is transmitted only when the battery power reaches a certain percentage, such as 2%. This number may be dynamic based on current information about the user and/or user device. For example, if the user device has been actively used for many activities, including ones requiring extensive power, or is being used on a call, the percentage may be higher. If the user device has been inactive, the percentage may be lower. The threshold may also be based on a user's current location, e.g., if the user is near an area known to have charging stations, the threshold percentage may be lower than in an area without charging stations. Thus, the user device is not always transmitting a signal that includes remaining battery power as in the above steps, but only when it reaches a certain threshold.

Once the payment provider determines that the remaining capacity of the battery is below the threshold (i.e., the user device is running out of battery power), the process 200 may continue at step 206 with determining whether a potential payment for a user, service, and/or a merchant may be needed. Such a determination process may be implemented in any number of ways. Alternatively, in some other embodiments, the process 200 may route to step 207 with taking or suggesting action, by the payment provider, to the user after the payment provider determines that the battery power of the user device is running low, and based on various further information. Such information may include user's shopping habits, user location, current device power usage, and predicting shopping. Example of actions being taken by the payment provider and/or suggested to the user may include ending a phone conversation, closing certain apps, pausing a data transfer or download, etc.

In an embodiment, the determination process may be implemented based on the user's spending history. The payment provider may store the user's spending history to associate with the user's account. Alternatively stated, the spending history may be stored locally in the user device or in a database of the payment provider having multiple user accounts. In general, the spending history includes how many times during a past period of time a user has shopped with a merchant or at a merchant location, how many times a user has made a financial transaction with another user, how many times a user has paid for a service/merchant, and the user's spending behavior during a past period of time. A spending behavior may be recognized by the payment provider from the user's spending history. As an example of user's spending behavior, the payment provider may recognize that a user has used a particular cab service between 5 pm to 6 pm every day for the past one week.

In another embodiment of the determination process, the process may be implemented based on whether the user has checked in at a merchant location or with a service/user. In an example, a wireless beacon installed at a merchant location may be used to enable a user to check in at the merchant location. The wireless beacon at the merchant location may continuously broadcast a request signal to any mobile device in proximity. A user device may complete a check-in process via responding to the request signal. The payment provider may determine that the user device has checked in at the merchant location through a communication between the user device, or the wireless bacon, and the payment provider. After the payment provider acknowledges that the user has checked in at the merchant location, the payment provider and/or merchant may receive an indication of battery power remaining in the user device. Based on such an indication, that the payment provider and/or merchant may decide that a potential payment may be needed by the user at the merchant location.

If the determination process at step 206 is implemented through the user's spending history, the process 200 routes to step 208. On the other hand, if the determination process is performed according to the user's check-in process, the process 200 routes to step 210 with further determining whether the merchant location in which the user has checked in is a pre-authorized merchant or merchant location.

At step 208, the payment provider may make an instant payment to a user/service/merchant without further requesting a user authentication. Continuing with the cab service example, in another day around 5:30 pm, even though the user has not made a request to make a payment to a cab service, the payment provider may make a payment to the particular cab service that the user has used for the past seven days. As such, a payment to the cab service is made before the user device becomes unable to request the payment (i.e., the battery of the user device is fully depleted). Such instant payment without the user's further authentication, or even without user's awareness, may advantageously ensure one or more payments being made without a requirement for a user paying additional attention to a low-battery situation of a user device. Continuing with the example, the user may take the cab service (e.g., sitting in a cab) at 5:20 pm and simultaneously uses the user device for other actions, such as making a conference call. If the battery of the user device is running low during the conference call, the capacity of the battery may be depleted in a faster rate than a usual rate that the user is normally aware of. Thus, the user device may become unable to make a payment to the cab service at the time the user would like to pay (generally, after the user reaches a destination). Thus, processing a payment as described at step 208 may advantageously ensure a user who is always able to use a user device to perform a payment.

At step 210, the payment provider further determines whether a checked in user/service/merchant is pre-authorized. As mentioned at step 106 of process 100 in FIG. 1, a user may specify one or more pre-authorized users/services/merchants that are associated with the LBDW account. If the payment provider determines that a previously checked in user/service/merchant is pre-authorized, the process 200 routes at step 212 with processing an instant payment without further requesting a user authentication and/or without further communicating with the user. However, if the payment provider determines that the previously checked in user/service/merchant is not pre-authorized, the process 200 routes at step 214 with further communicating with the user by generating a request signal for the user to authorize a payment.

Referring still to step 214, in some illustrative embodiments, the request signal may be displayed via a user interface or a mobile app of the user device to the user. More specifically, the request signal may include battery information (e.g., remaining capacity is low), merchant information, and/or a proposed amount of payment that the user may desire to make. For example, after a user has checked in at a coffee shop that is not pre-authorized by the user, the payment provider may generate a signal through the user device to the user, such as "the battery's capacity is running low, do you want to make a payment to the merchant?" Additionally or alternatively, the proposed amount of payment may be determined by the payment provider based on the user's spending history.

In accordance with an alternative embodiment, even though a user/service/merchant is not pre-authorized, the payment provider may still make a payment to the checked in user/service/merchant especially when the battery capacity has reached a critically low level. Under this situation, the request signal described at step 214 may or may not be received by the user to authorize a payment. As such, a payment is assured to be made with the user's account (LBDW account) and without consuming any additional power to the user device. In some embodiments, the critical low level may be a level lower than the predetermined threshold. For example, if a predetermined threshold is set at 20% of a fully battery capacity, a critical low level may be predetermined at 5%.

For additional security, after the payment has been made with or without user's further authentication, a user may be refunded any additional amount of payment that is not responsible to the user. For example, after the payment provider determines that a user's device is running out of battery, the payment provider may make a payment of $100 USD to a cab service based on the user's previous spending behavior. However the user may have taken a different trip this time while using the cab service, so the user is only responsible for a lesser amount of payment (e.g., $70 USD) to the cab service. As such, the user may receive a fund of $30 USD from the payment provider or the cab service based on additional proof. The additional proof may include a digital receipt retrieved by the user though any suitable way, for example, via email.

Figure 3:
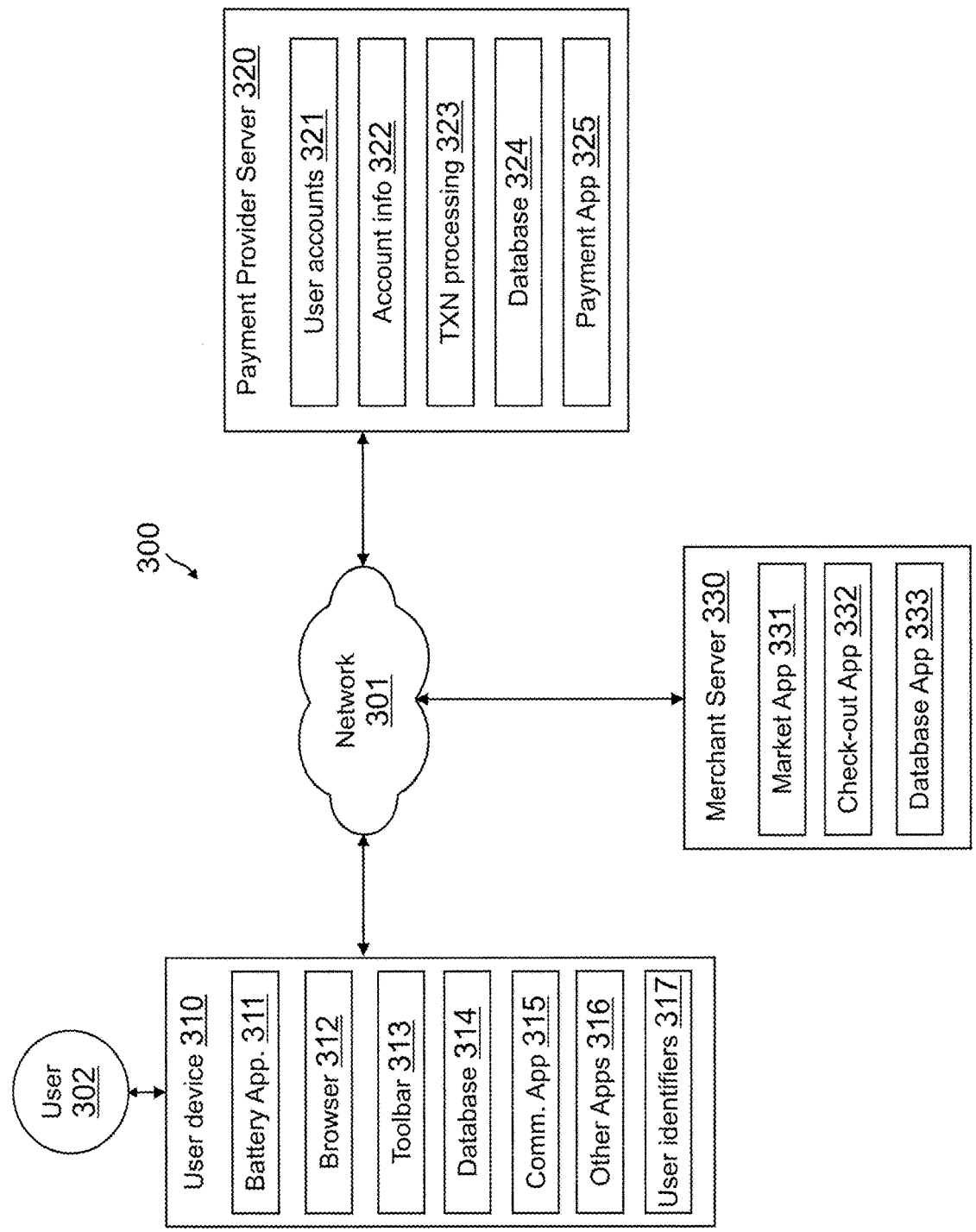
FIG. 3 is a block diagram of a networked system suitable for implementing the process described herein, according to an embodiment.

FIG. 3 is a block diagram of a networked system 300 configured to handle a transaction using a low battery digital wallet (LBDW), such as described above, in accordance with an embodiment of the invention. System 300 includes a user device 310, a merchant server 330, and a payment provider server 320 in communication over a network 301. Payment provider server 320 may be maintained by a payment provider, such as PayPal, Inc. of San Jose, Calif. A user 302, such as a sender or consumer, utilizes user device 310 to perform transactions using payment provider server 320, such as setting up and using a LBDW account.

User device 310, merchant server 330, and payment provider server 320 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 301.

Network 301 may be implemented as a single network or a combination of multiple networks. For example, in various embodiments, network 301 may include the Internet or one or more intranets, landline networks, wireless networks, and/or other appropriate types of networks.

User device 310 may be implemented using any appropriate hardware and software configured for wired and/or wireless communication over network 301. For example, in one embodiment, the user device may be implemented as a smart phone, personal computer (PC), personal digital assistant (PDA), laptop computer, and/or other types of computing devices capable of transmitting and/or receiving data, such as an iPad™ from Apple™. The user may use different user devices to perform different transactions described above. For example, the user may use a PC or laptop to set up the travel account, but then use a smart phone to make the payment request while traveling.

User device 310 may include one or more battery applications 311 which may be used, for example, to monitor a remaining capacity of a battery of user device 110. For example, in an embodiment, battery application 311 may be implemented as a battery monitor to provide a prediction informing user 302 of the remaining capacity of the battery. In general, the remaining capacity prediction of a battery may be based on the state of charge for the battery. The state of charge (SOC) for a battery is a characterization of the percentage of remaining energy, or capacity, available from the battery. The units of SOC may be percentage points (0% designating a fully drained battery; 100% designating a fully charged battery).

User device 310 may include one or more browser applications 312 which may be used, for example, to provide a convenient interface to permit user 302 to browse information available over network 301. For example, in one embodiment, browser application 312 may be implemented as a web browser configured to view information available over the Internet. User device 310 may also include one or more toolbar applications 313 which may be used, for example, to provide client-side processing for performing desired tasks in response to operations selected by user 305. In one embodiment, toolbar application 313 may display a user interface in connection with browser application 313 as further described herein. For example, user 302 may use toolbar application 313 to designate a pre-authorized user/service/merchant by toggling on/off each of the users/services/merchants.

User device 310 may further include other applications 316 as may be desired in particular embodiments to provide desired features to user device 310. For example, other applications 316 may include security applications for implementing client-side security features, programmatic client applications for interfacing with appropriate application programming interfaces (APIs) over network 301, or other types of applications. Applications 316 may also include email, texting, voice and IM applications that allow user 302 to send and receive emails, calls, and texts through network 301, as well as applications or mobile apps that enable the user to communicate, transfer information, and make payments through the payment provider as discussed above. User device 310 includes one or more user identifiers 317 which may be implemented, for example, as operating system registry entries, cookies associated with battery application 311, browser application 312, toolbar application 313, identifiers associated with hardware of user device 310, or other appropriate identifiers, such as used for payment/user/device authentication. In one embodiment, user identifier 317 may be used by a payment service provider to associate user 302 with a particular account maintained by the payment provider, such as a LBDW account. A communications application 315, with associated interfaces, enables user device 310 to communicate within system 301. For example, user device 310 may use communication application 315 to transmit a signal to payment provider server 320 indicating that a remaining capacity of user device 310's battery. User device 310 may also further include database 314 to store user identifiers 317. In some embodiments, database may also store any suitable information associated with user 302, for example, user's spending history.

Merchant server 330 may be maintained, for example, by a merchant or seller offering various products and/or services in exchange for payment to be received over network 301. Merchant server 330 may be used for point-of-sale (POS) or online purchases and transactions. Generally, merchant server 330 may be maintained by anyone or any entity that receives money, which includes charities as well as retailers and restaurants. Merchant server 330 includes a database 332 identifying available products and/or services (e.g., collectively referred to as items) which may be made available for viewing and purchase by user 302. Accordingly, merchant server 330 also includes a marketplace application 331 which may be configured to serve information over network 301 to browser 312 of user device 310. In one embodiment, user 302 may interact with marketplace application 331 through browser applications over network 301 in order to view various products, food items, or services identified in database 332.

Merchant server 330 also includes a checkout application 332 which may be configured to facilitate the purchase by user 302 of goods or services identified by marketplace application 331. Checkout application 355 may be configured to accept payment information from or on behalf of user 305 through payment service provider server 320 over network 301, such as at a physical POS or online. For example, checkout application 332 may receive and process a payment confirmation from payment service provider server 320, as well as transmit transaction information to the payment provider and receive information from the payment provider (e.g., a transaction ID).

Payment provider server 320 may be maintained, for example, by an online payment service provider which may provide payment between user 302 and the operator of merchant server 330. In this regard, payment provider server 320 includes one or more payment applications 325 which may be configured to interact with user device 310 and/or merchant server 330 over network 301 to facilitate the purchase of goods or services, communicate/display information.

Payment provider server 320 also maintains a plurality of user accounts 321, each of which may include account information 322 associated with individual users, including LBDW account information for users. For example, account information 322 may include private financial information of users of devices such as account numbers, passwords, device identifiers, user names, phone numbers, credit card information, bank information, information for a user LBDW account (e.g., user's pre-authorized user/service/merchant, limits to each pre-authorized user/service/merchant, etc.), as discussed above, or other financial information which may be used to facilitate online transactions by user 302. Advantageously, payment application 325 may be configured to interact with merchant server 330 on behalf of user 302 during a transaction with checkout application 332 to make a payment with and/or without user's authentication while user device 310's battery is running low.

A transaction processing application 323, which may be part of payment application 325 or separate, may be configured to receive information from a user device and/or merchant server 340 for processing and storage in a payment database 324. Transaction processing application 323 may include one or more applications to process information from user 305 for processing a payment while user device 310 is running out of battery. Payment application 325 may be further configured to determine the existence of and to manage accounts for user 302, as well as create new accounts if necessary, such as the set up, management, and use of a LBDW account for the user.

Figure 4:
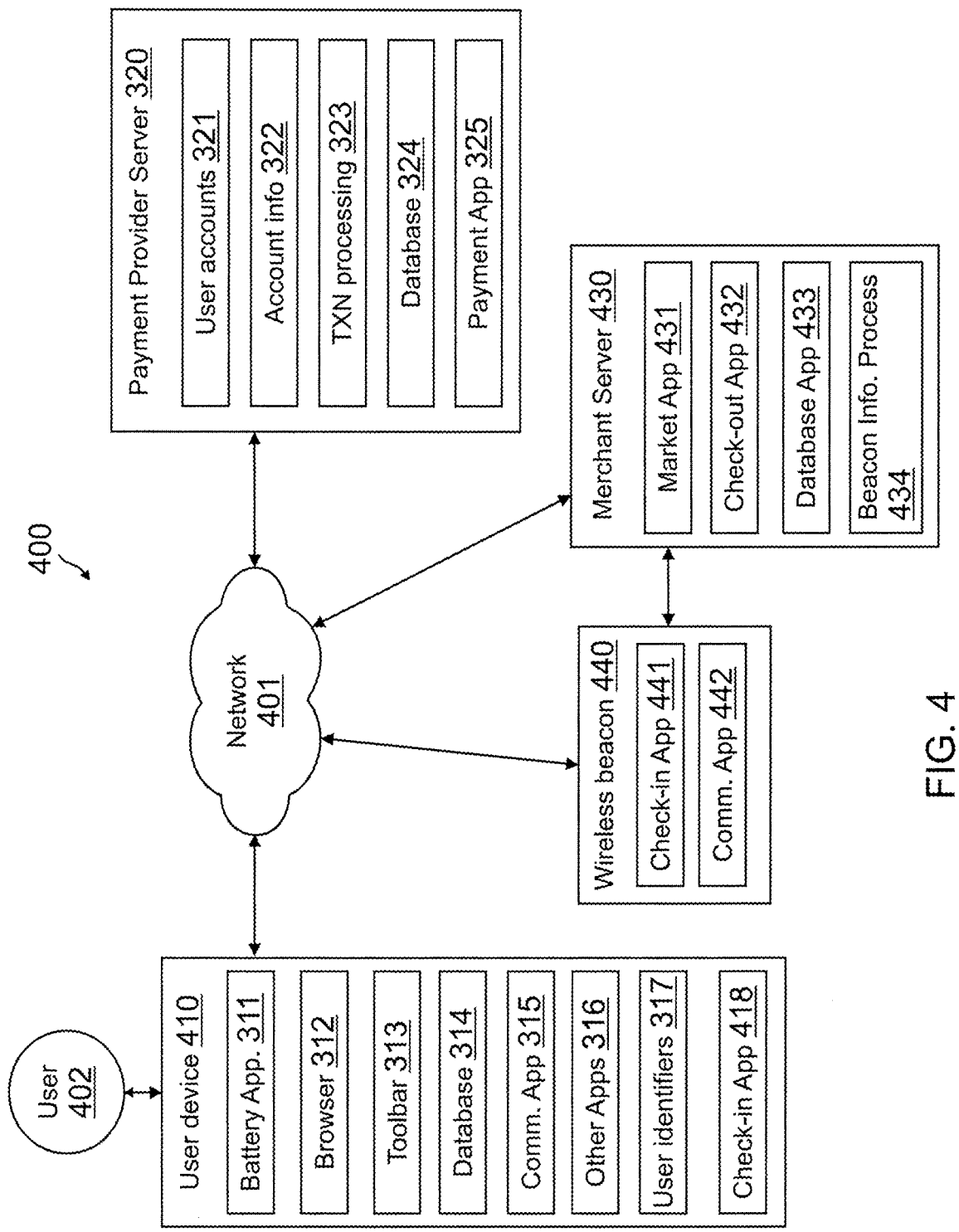
FIG. 4 is a block diagram of another networked system suitable for implementing the process described herein, according to an embodiment.

FIG. 4 is a block diagram of a networked system 400 configured to handle a transaction using a low battery digital wallet (LBDW) via a check in process, such as described above, in accordance with an embodiment of the invention. System 400 includes a user device 410, a merchant server 430, a wireless beacon 440, and a payment provider server 320 in communication over a network 401. Payment provider server 320 may be maintained by a payment provider, such as PayPal, Inc. of San Jose, Calif. A user 402, such as a sender or consumer, utilizes user device 410 to perform transactions using payment provider server 320, such as setting up and using a LBDW account.

Different from user device 310 and merchant server 330 of FIG. 3, user device 410 and merchant server 430 in system 400 may include additional application(s) to process check in process described above. The following discussions will be focused on such additional applications(s).

As shown in FIG. 4, in addition to battery application 311, browser application 312, toolbar 313, database 314, communication application 315, other applications 316 and user identifiers 317, user device 410 may further include a check-in application 418. Check-in application 418 may be used by user 402 of user device 410 to establish a connection with wireless beacon 440, including a check-in with a merchant location for wireless beacon 440/merchant server 430. Check-in application 418 may correspond to a specific application utilized by user device 410 with wireless beacon 440 and/or merchant server 430 to complete a check-in. The check-in may correspond to a process to log in to a user account of user 411 with merchant server 430 (or payment provider server 320 if payment provider server 320 provides check-in services for the merchant location). In other embodiments, the check-in may provide and/or verify the identity of user 402, including transmission of an identifier for user 402 and/or user device 410. The check-in may be completed over network 401 with merchant server 430 and/or payment provider server 320. In such embodiments, check-in application 418 may correspond more generally to browser application 312 configured to communicate with merchant server 430 over a network connection (e.g., over a connection with network 401).

In various embodiments, check-in application 418 may also receive short range wireless communications from wireless beacon 440 at a location and transmit information to wireless beacon 440, including check-in information for a check-in process with the merchant location for merchant server 430 (or payment provider server 320 if payment provider server 320 provides check-in services for the merchant location) that associates user 402 with wireless beacon 430. For example, wireless beacon 430 may be located at the merchant location and set up to communicate with user device 4100 when user device 410 is in proximity to wireless beacon 440. Thus, wireless beacon 440 may be range limited to connect only with devices (e.g., user device 160) within the specified area, such as a radius around wireless beacon 440, a distance away from wireless beacon 440, and/or a signal direction for wireless beacon 440. Merchant server 430 may determine that user 402 is located in proximity to wireless beacon 440 using the connection. Such connection may be implemented using one or more of near field communication, Bluetooth, Bluetooth Low Energy, radio, infrared, LTE Direct, and other communication protocol.

Wireless beacon 440 may be maintained, for example, by a merchant corresponding to merchant server 430, such as one associated with a merchant location where wireless beacon 440 may be established. Wireless beacon 440 may be implemented using any appropriate hardware and software configured for wireless communication with user device 402, merchant server 4300, and/or payment provider server 320. For example, in one embodiment, wireless beacon 440 may be implemented as a dongle device including a hardware processor and a communication module, for example, connected to a device at the merchant location (e.g., merchant server 430). Wireless beacon 440 may also be implemented as a device incorporated within a personal computer (PC), a smart phone, laptop computer, and/or other types of computing devices capable of transmitting and/or receiving data, such as an IPAD® from APPLE®. Wireless beacon 440 may also act as a stand-alone device including a processor, communication module, and/or network interface component configured to communicate with user device 402, merchant server 430, and/or payment provider server 320. Although a single beacon is described, a plurality of wireless beacons may be utilized at the location corresponding to user 402.

In some embodiments, wireless beacon 440 may be located at a physical location corresponding to merchant server 430. The physical location may correspond to a merchant location, such as a retail store. Wireless beacon 440 of FIG. 4 contains processes, procedures, and/or applications, for example, a software program, executable by a hardware processor configured to interact with user device 402, merchant server 430, and/or payment provider server 320. Thus, regardless of the implementation of wireless beacon 440, as discussed above, wireless beacon 440 utilizes a check-in application 441 and a communication application 442. In other embodiments, wireless beacon 440 may include additional or different software and devices as required.

Check-in application 441 may correspond to an application for transmitting requests to establish a connection between a device (e.g., user device 402) and wireless beacon 440. Thus, wireless beacon 440 may utilize short range wireless communications to transmit the requests to establish a connection, including an identifier such as a Universally Unique Identifier (UUID). If user device 410 receives a request to establish the connection with wireless beacon 440 and responds with a user device identifier (potentially including the UUID and other information necessary to effectuate a check-in of user device 440), check-in application 441 may cause wireless beacon 440 to ramp up in power and create a connection between user device 410 and wireless beacon 440.

Wireless beacon 440 may transmit the request to establish the connection with wireless beacon device 440 as a short range wireless communication (e.g. a BLE protocol communication) including a "wake up" process for check-in application 418 of user device 410 and/or a token for wireless beacon 440. In other embodiments, the request and/or connection may utilize near field communication, radio communication, infrared communication, Bluetooth communication, or WiFi communication. Additionally, although wireless beacon 440 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacon 440 (e.g., user device 160) and establishment of a connection for data transfers.

In various embodiments, wireless beacon 440 includes at least one communication application 442 adapted to communicate with user device 410, merchant server 430, and/or payment provider server 320. Communication application 442 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication application 442 may communicate with user device 410 and/or merchant server 430 using short range communications, such as radio frequency, infrared, Bluetooth, and near field communications.

In order to communicate with beacon 440, different from merchant server 330 of FIG. 3, merchant server 430 of FIG. 4 may further includes a beacon information processing application 434. Market application 431, checkout application 432, and database 433 of merchant server 430 in FIG. 4 may be implemented similarly as those of merchant server 430 in FIG. 3. Thus, only beacon information processing application 434 will be discussed below.

Beacon information processing application 434 may correspond to processes, procedures, and/or applications, for example, a software program, executable by a hardware processor. In other embodiments, merchant server 430 may include additional or different software as required.

Beacon information processing application 434 may include processes to complete a check-in with user device 410 for a merchant location corresponding to wireless beacon 440/merchant server 430 (e.g., with one or more of wireless beacon 440 established at the merchant location). Thus, beacon information processing application 434 may correspond to the merchant server side application configured to receive check-in information from user device 410 and complete the check-in. The check-in request may include log in information for a user account with the merchant corresponding merchant server 430 or an account with payment provider server 320 and thus complete the check-in with user 402 by verifying the account information. For example, the check-in information may include an identifier or other account information for a user/payment account of user 402. However, in embodiments where a user account has not been previously established by user 402, beacon information processing application 434 may receive other information identifying user 402, including a user name/identifier, user device identifier, an identifier for an account with another server (e.g., payment provider server 320), or other information. The information provided to wireless beacon 440 does not need to be utilized to complete a check-in with merchant server 430. Thus, in other embodiments, beacon information processing application 434 may receive an identifier or other identification information for user 402/user device 410 with application information for processing.

FIG. 5 is a block diagram of a computer system 500 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant server, or a payment provider server via network 301 or 401. In one embodiment, the transmission is wireless, although other transmission mediums and methods may also be suitable. A processor 512, which can be a micro-controller, digital signal processor (DSP), or other processing component, processes these various signals, such as for display on computer system 500 or transmission to other devices via a communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing a payment account of a user and a low battery digital wallet for the payment account, wherein the low battery digital wallet comprises one or more restrictions for payments made using the low battery digital wallet when a remaining battery power has reached a threshold depletion power; and
one or more hardware processors configured to execute instructions to cause the system to perform operations comprising:
establishing a connection between a user device of the user and a wireless device at a merchant location of a merchant;
receiving, from the wireless device via the connection, one or more signals from the user device, wherein the one or more signals indicate information about the remaining battery power of the user device and an application process currently being executed by the user device, and wherein the one or more signals further comprises identification information for the user, the user device, and the low battery digital wallet;
authenticating the user for a use of the low battery digital wallet at the merchant location using the identification information received in the one or more signals;
processing, at the merchant location prior to initiating a transaction between the merchant and the user, a location-based check-in of the user device at the merchant location;
detecting that the remaining battery power has reached the threshold depletion power at the merchant location based on the one or more signals;
limiting execution of the application process on the user device without user input based on the remaining battery power reaching the threshold depletion power;
determining, based on the location-based check-in, a potential transaction with the merchant for processing with the payment account of the user;
determining, during the connection and based on detecting that the remaining battery power has reached the threshold depletion power, that the remaining battery power is insufficient to complete the potential transaction using the user device;
providing, based on determining that the remaining battery power is insufficient to complete the potential transaction, a payment for the potential transaction to the merchant using the low battery digital wallet, wherein the payment provides a maximum amount to the merchant for the potential transaction based on the one or more restrictions, and wherein the payment is provided for the potential transaction without further use of the user device by the user; and
refunding the payment account when the maximum amount for the payment is greater than an amount of an actual purchase made by the user with the merchant.

2. The system of claim 1, wherein the threshold depletion power is either a predefined value or a dynamically changed value.

3. The system of claim 2, wherein the threshold depletion power is a dynamically changed value and the dynamically is changed based on the one or more signals, and wherein the one or more signals further comprises a signal identifying a current location of the user device.

4. The system of claim 1, wherein determining the potential transaction is based on whether the user device is checked-in with the merchant via the connection to the wireless beacon at a checkout location.

5. The system of claim 4, wherein the connection uses one or more of a near field communication, a radio communication, an infrared communication, a Bluetooth communication, a Bluetooth Low Energy (BLE) communication, a WiFi communication, or an LTE Direct communication.

6. The system of claim 1, wherein, after the user device is checked-in with the merchant and based on the remaining battery power of the user device, the operations further comprise:

determining whether the merchant is pre-authorized in the payment account.

7. The system of claim 1, wherein the operations further comprise:
communicating a request to the user device if the merchant is not authorized.

8. The system of claim 1, wherein determining the potential transaction is further based on a spending history of the user.

9. The system of claim 8, wherein the spending history comprises how many times the payment account has been used to shop with the merchant during a past period of time and a user spending behavior during the past period of time.

10. The system of claim 1, wherein the operations further comprise:
receiving a preauthorization amount from the merchant; and
determining the maximum amount based on the preauthorization amount.

11. A method comprising:
establishing a connection between a user device of a user and a wireless device at a merchant location of a merchant;
receiving, from the wireless device via the connection, one or more signals from the user device of the user, wherein the one or more signals indicate information about a remaining battery power of the user device and an application process currently being executed by the user device, and wherein the one or more signals further comprises identification information for the user, the user device, and a low battery digital wallet of a payment account of the user, wherein the low battery digital wallet comprises one or more restrictions for payments made using the low battery digital wallet when the remaining battery power has reached a threshold;
authenticating the user for a use of the low battery digital wallet at the merchant location using the identification information received in the one or more signals;
processing, at the merchant location and prior to initiating a transaction between the merchant and the user, a location-based check-in of the user device at the merchant location;
detecting that the remaining battery power has reached the threshold at the merchant location based on the one or more signals;
limiting execution of the application process on the user device without user input based on the remaining battery power reaching the threshold;
determining, based on the location-based check-in, a potential transaction with the merchant for processing with the payment account of the user; and
determining, during the connection and based on detecting that the remaining battery power has reached the threshold, that the remaining battery power is insufficient to complete the potential transaction using the user device;
providing, by a payment provider device and based on determining that the remaining battery power is insufficient to complete the potential transaction, a payment for the potential transaction to the merchant, wherein the payment provides a maximum amount to the merchant for the potential transaction based on the one or more restrictions, and wherein the payment is provided for the potential transaction without further use of the user device by the user; and
refunding the payment account when the maximum amount for the payment is greater than an amount of an actual purchase made by the user with the merchant.

12. The method of claim 11, wherein determining the potential transaction comprises determining whether the user device is checked in with the merchant via the connection between the user device and the wireless beacon at a checkout location of the merchant location.

13. The method of claim 11, further comprising:
determining whether the merchant is pre-authorized after the user device is checked in with the merchant; and
communicating an authentication request to the user device when the merchant is not pre-authorized.

14. The method of claim 11, wherein determining the potential transaction is based on a user spending history.

15. The method of claim 11, wherein providing the payment using the payment account is further based on the threshold for the remaining battery power.

16. The method of claim 15, wherein the threshold is a value that dynamically changes in accordance with a current location of the user device.

17. The method of claim 11, further comprising:
determining electronic communications sent and/or received by the user device, wherein the threshold is dynamic based on the electronic communications.

18. The method of claim 11, further comprising:
receiving a preauthorization amount from the merchant; and
determining the maximum amount based on the preauthorization amount.

19. A non-transitory machine-readable medium having stored thereon machine-readable instructions executable to cause a machine to perform operations comprising:
establishing a connection between a user device of a user and a wireless device at a merchant location of a merchant;
receiving, from the wireless device via the connection, one or more signals from the user device of the user, wherein the one or more signals indicate information about a remaining battery power of the user device and an application process currently being executed by the user device, and wherein the one or more signals further comprises identification information for the user, the user device, and a low battery digital wallet of a payment account of the user, wherein the low battery digital wallet comprises one or more restrictions for payments made using the low battery digital wallet when the remaining battery power has reached a depletion power threshold;
authenticating the user for a use of the low battery digital wallet at the merchant location using the identification information received in the one or more signals;
processing, at the merchant location and prior to initiating a transaction between the merchant and the user, a location-based check-in of the user device at the merchant location;
detecting that the remaining battery power has reached the depletion power threshold at the merchant location based on the one or more signals;
limiting execution of the application process on the user device without user input based on the remaining battery power reaching the depletion power threshold;
determining, based on the location-based check-in, a potential transaction with the merchant for processing with the payment account of the user;
determining, during the connection and based on detecting that the remaining battery power has reached the depletion power threshold, that the remaining battery power is insufficient to complete the potential transaction using the user device;

providing, based on determining that the remaining battery power is insufficient to complete the potential transaction, a payment for the potential transaction to the merchant, wherein the payment provides a maximum amount to the merchant for use by the user for the potential transaction based on the one or more restrictions, and wherein the payment is provided for the potential transaction without further use of the user device by the user; and refunding the payment account when the maximum amount for the payment is greater than an amount of an actual purchase made by the user with the merchant.

20. The non-transitory machine-readable medium of claim 19, wherein the operations further comprise:

determining that the user device is performing a voice call based on the one or more signals, wherein the depletion power threshold is dynamic based on the voice call.

* * * * *